United States Patent [19]
Swanson

[11] Patent Number: 5,887,479
[45] Date of Patent: Mar. 30, 1999

[54] LIQUID-LEVEL GAUGE DRIVER CIRCUIT

[75] Inventor: David F. Swanson, Howell, Mich.

[73] Assignee: STMicroelectronics, Inc., Carrolltonl, Tex.

[21] Appl. No.: 775,642

[22] Filed: Dec. 31, 1996

[51] Int. Cl.⁶ .................................................. G01F 23/00
[52] U.S. Cl. ........................................ 73/290 R; 340/618
[58] Field of Search ................................... 340/618, 620, 340/450.2, 450; 73/290 R, 304 R, 308, 304 C; 364/509, 562

[56] References Cited

U.S. PATENT DOCUMENTS

| | | | |
|---|---|---|---|
| 3,678,749 | 7/1972 | Harper | 73/304 R |
| 3,811,051 | 5/1974 | Merrill | 340/624 |
| 3,938,117 | 2/1976 | Bozoian | 340/244 R |
| 4,174,626 | 11/1979 | Agawa | 73/113 |
| 4,177,770 | 12/1979 | Anderson | 123/32 EE |
| 4,179,740 | 12/1979 | Malin | 364/442 |
| 4,430,622 | 2/1984 | Simoes | 330/9 |
| 4,559,507 | 12/1985 | Ramsdale | 73/304 C |
| 4,584,554 | 4/1986 | Weiss | 340/620 |
| 4,721,957 | 1/1988 | Buttle | 340/870.39 |
| 4,806,847 | 2/1989 | Atherton | 340/620 |
| 4,991,435 | 2/1991 | Colarossi | 73/313 |
| 5,257,300 | 10/1993 | Bennett | 340/618 |
| 5,460,028 | 10/1995 | Werner | 73/1 R |
| 5,483,109 | 1/1996 | Gholston | 73/290 R |

*Primary Examiner*—Christine K. Oda
*Attorney, Agent, or Firm*—David V. Carlson; Theodore E. Galanthay; Lisa K. Jorgenson

[57] ABSTRACT

A liquid level sensor unit outputs a voltage value, which corresponds to a measured liquid level, to an anti-slosh circuit that provides a fast timing rate during the initial condition of the circuit and a slow timing rate during the normal operation of the circuit. The anti-slosh circuit further includes a low liquid level warning circuit and a power-on-reset circuit. The system timing rate can be externally controlled by connecting an RC circuit to the improved anti-slosh circuit. A customer defined reference level for low liquid warning is also possible. The entire circuit is included on a single, monolithic integrated circuit. An input pin receives the signal from the fuel tank. An output pin drives a liquid level gauge.

10 Claims, 2 Drawing Sheets

LIQUID-LEVEL GAUGE DRIVER CIRCUIT

BACKGROUND OF THE INVENTION

1. FIELD OF THE INVENTION

The present invention relates generally to a liquid level indicating system and more particularly to an improved anti-slosh fuel gauge interface circuit for monitoring liquid level variations within a liquid tank.

2. DESCRIPTION OF THE RELEVANT ART

For many years, the auto industry has employed fuel gauge systems to measure fuel level in fuel tanks of motor vehicles. A basic fuel gauge system typically includes a fuel level sensor and a visual gauge to provide the driver the status of the fuel level in the motor vehicle. The fuel gauge indicates the fuel level by receiving fuel level information from the fuel level sensor placed within the fuel tank of the motor vehicle. Ideally, the fuel level sensor will correctly measure the fuel level in the tank at all times during the operation of the motor vehicle. Unfortunately, the normal maneuvering of the motor vehicle causes inevitable transient variations of the fuel level, commonly known as fuel sloshes. As a result, many damping arrangements have been incorporated into commercial fuel gauge systems to overcome rapid transient movements of the fuel gauge due to fuel sloshes. A modern fuel gauge system typically adopts an electrical damping circuit although some older prior arts include mechanical damping devices.

Examples of related prior art techniques are described in U.S. Pat. Nos. 5,257,300; 4,991,435; 3,938,117; 3,678,749; 4,174,626 and 4,179,740.

The prior art techniques normally employ RC circuits to provide signals for the fuel gauge system. This type of anti-slosh fuel gauge system is based on a large capacitor and a large resistor in order to generate an extremely large time constant to provide an electrical damping function used to minimize the slosh effect. The problem with this type of fuel gauge system is that the time constant is inconsistent over the gauge range and therefore can not always provide an accurate reading on the fuel level. Moreover, the RC circuit's time constant changes as the circuit ages. Another problem with modern fuel gauge systems is that a large capacitor and a large resistor require a larger sized integrated circuit to process the signal, making them more expensive to manufacture. They also consume more power. With the existing systems, it is virtually impossible to eliminate these problems without major performance loss or cost penalties.

SUMMARY OF THE INVENTION

One object of the present invention is to provide a liquid level gauge interface system with an anti-slosh circuit without the need of a large capacitor and a large resistor, thereby eliminating the ever-changing, unreliable, time constant issue.

A further object of the present invention is to provide a liquid level gauge interface system having a digital logic circuit with multiple timing rates so that a fast liquid level reading on the gauge can be obtained at the initial operation of the motor driven vehicle yet the slower timing prevents large liquid level gauge fluctuations even though fuel sloshes are occurring in the tank during the normal operation of the motor driven vehicle.

Another object of the current invention is to provide an adjustable level of low liquid warning for the liquid level gauge interface system. At selected time intervals, a signal corresponding to the liquid level in a liquid tank is provided to a circuit for showing the driver the amount of fuel left in the tank. When the signal of the liquid level shows that the liquid level in the tank is lower than a predetermined value, the circuit outputs a low level warning signal to indicate a low liquid level. The fuel level at which the warning value is generated can be externally adjusted by a manufacturer allowing incorporating of the current invention into other systems.

In one embodiment, an externally connected voltage divider circuit may be added by a customer to provide an adjustable reference voltage allowing adjustment in the level at which the low liquid warning is triggered. The voltage divider circuit can be externally connected to the liquid level gauge interface system. Therefore, the manufacturer of the motor driven vehicle can calibrate the voltage divider circuit to provide the desirable low liquid warning level. Of course, the customer does not need to select this threshold and can rely on the threshold level programmed into the circuit. In addition, a current multiplying circuit may be included to compensate any power supply voltage fluctuation and keep the indicator of the liquid level gauge at the same position thereby maintaining an accurate indication of the liquid level.

DETAILED DESCRIPTION OF THE PREFERRED EMBODIMENTS

Figure 1:
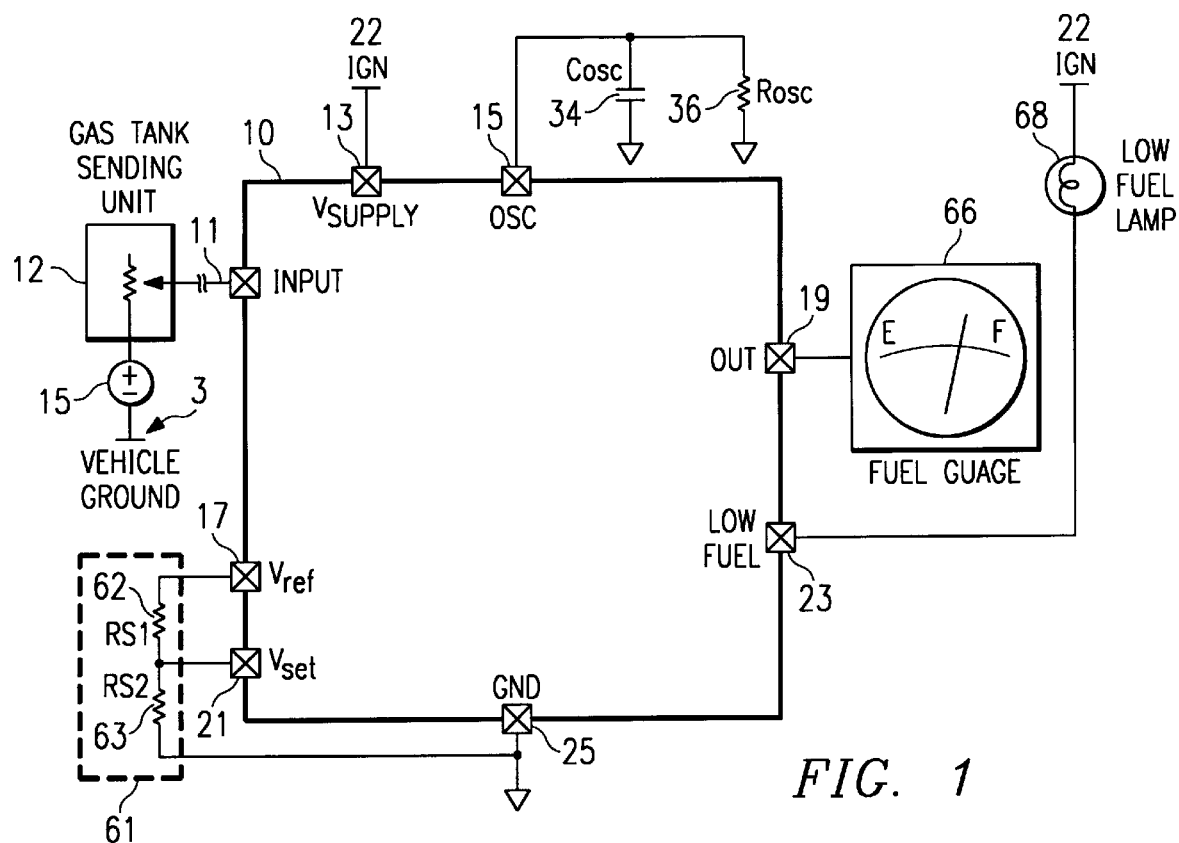
FIG. 1 is a schematic of the sense system according to the invention.

FIG. 1 illustrates a single integrated circuit 10 coupled via an electronic wire 11 to a sending unit 12. The sending unit is inside of a fuel tank and provides an indication of the level of fuel in the tank. The sending unit 12 is connected to a vehicle ground 3. Illustrated schematically as 15 is a variable offset voltage which may exist between the sending unit 12 and ground 3 of the vehicle. The ground offset 15 sometimes occurs between the sending unit and the gauge driver system. The value of this ground offset 15 may vary greatly over time so that the effective vehicle ground 3 does not equal the circuit ground 25. With modern systems, it is very difficult to eliminate the variability in the ground offset 15. This variable ground offset 15 creates undesirable noise on the line.

According to principles of the present invention, the integrated circuit 10 eliminates errors due to the ground offset 15. The present invention also eliminates the need for a large capacitor and high value resistor. This provides the advantage of eliminating fuel gauge error as a result of an often changing, unreliable signal from a fuel sensor in a fuel tank. The present invention is able to provide an accurate fuel gauge reading using presently used sending units within a fuel tank.

Figure 2:
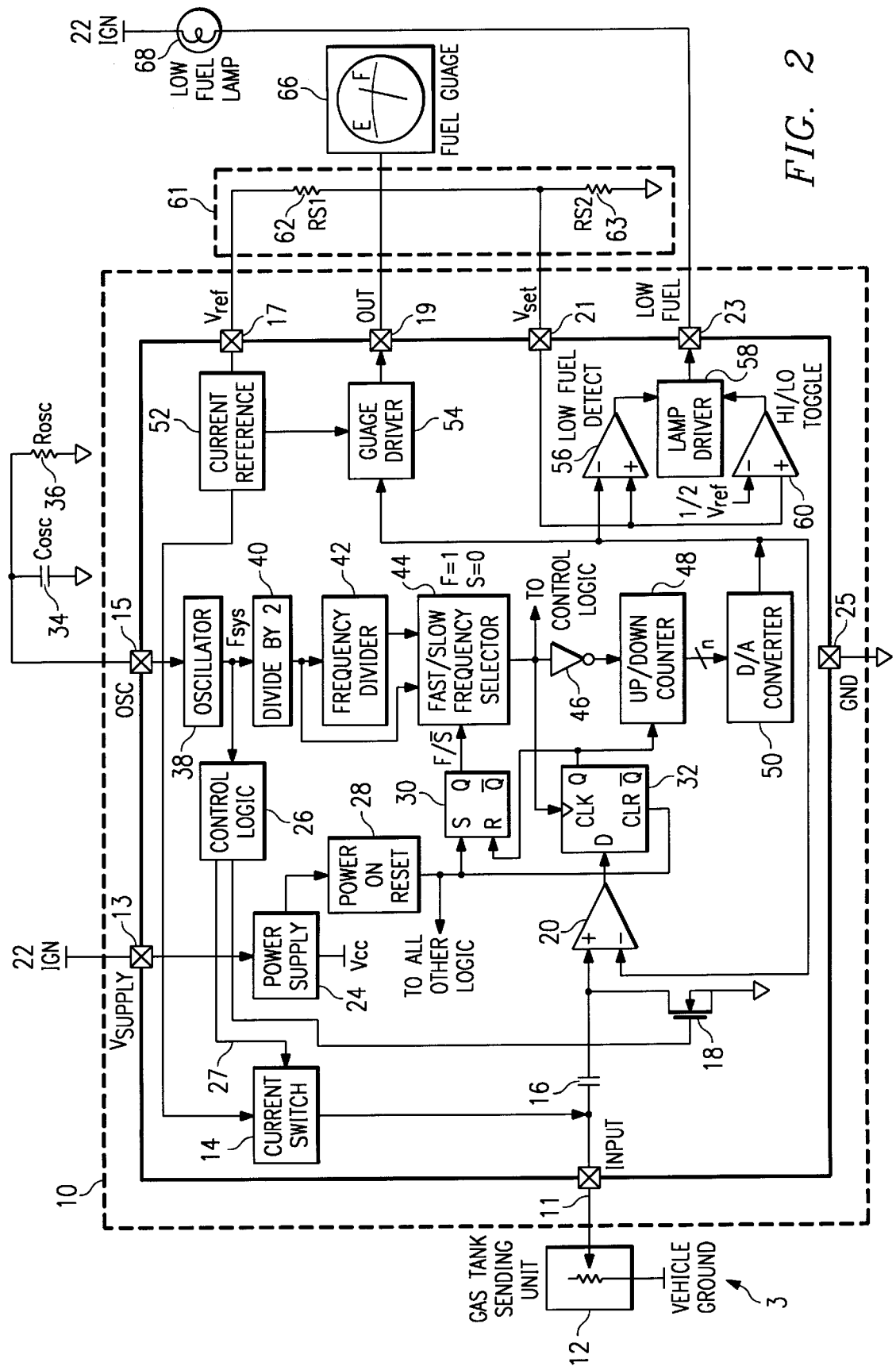
FIG. 2 is a schematic block diagram of the liquid level gauge interface system including a digital logic frequency selector circuit, a low liquid level warning circuit and some of the external components in accordance with the present invention.

FIGS. 1 and 2 show the input signal line 11 from the fuel sensor 12 and output signal line 19 to the visual display gauge 66. Power is provided from the automobile power system on voltage supply line 13. Externally connectable elements may be added to the circuit depicted in FIG. 1, including a liquid level sensor unit, a voltage divider circuit, an externally connected RC circuit, a liquid level gauge and a low liquid level warning lamp according to one alternative embodiment of the present invention.

A liquid level sensor unit 12 is connected to the output of a current switch 14 through the input signal line 11 of a process unit 10. The process unit 10 can be embodied in a single semiconductor IC chip as shown by the dashed line. The liquid level sensor unit 12 is also connected to the non-inverting input of a comparator circuit 20. The current switch 14 is connected to a control logic circuit 26 through a line 27 for receiving control signals.

When the ignition 22 is off, the current switch 14 is disabled, thus, no voltage or current will be sent to the liquid level sensor unit 12 through the current switch 14. When the ignition is turned on, power is provided via voltage supply line 13 to power supply 24. The control logic circuit 26 enables the current switch 14 to allow a reference current Iref injected into the liquid level sensor unit 12. The reference current Iref generates a measured voltage corresponding to the liquid level within a liquid tank (not shown). The measured voltage is then fed into the non-inverting input of the comparator circuit 20. After the comparator circuit 20 receiving the measured voltage, the control logic circuit 26 then disables the current switch 14. At the start of a sense cycle, the FET 18 will be turned on first by the control logic circuit 26 to measure the offset voltage for the liquid level sensor unit 12. The offset voltage is then stored in the capacitor 16. After the offset voltage has been stored in the capacitor 16, the control logic circuit 26 turns off the FET 18. At the falling edge of the control signal, which turns off the FET 18, the control logic circuit 26 enables the current switch 14 to allow a reference current Iref injected into the liquid level sensor unit 12. The reference current Iref generates a measured voltage corresponding to the liquid level within a liquid tank (not shown). The measured voltage will be offset by the previously stored offset voltage in the capacitor 16. After being offset by the offset voltage, the measured voltage is then fed into the non-inverting input of the comparator circuit 20. After the comparator circuit 20 receives the measured voltage, the control logic circuit 26 then disables the current switch 14, and the aforementioned dynamic offset cycle starts again with the comparator 20 comparing a new measured voltage with the voltage from the output of a D/A converter 50. As previously mentioned, effective vehicle ground 3 may vary over time and often will not equal the circuit ground 25. The present invention recalibrates the circuit for any difference between the two ground values by performing a dynamic offset voltage correction before each measurement. The present invention thus provides a dynamic offset mechanism because an offset voltage that corresponds to the variations between vehicle ground and circuit ground is generated each time before the liquid level sensor unit voltage is offset and fed into the comparator circuit 20. The capacitor 16 has a very small capacitance. The impedance seen by capacitor 16 generated by the comparator 20 and the FET 18 is very high so there is no need to insert an extra capacitor. So long as the ignition remains ON, the cycle of comparing a measured voltage with one from the D/A converter 50 continues.

The ignition 22 is connected to a power supply circuit 24. When the ignition 22 is first turned on, the power supply 24 triggers a power-on-reset circuit 28 in order to reset the value of an up/down counter 48. The power-on-reset circuit 28 is connected to the CLR input of a D Flip-flop 32. The input of the up/down counter 48 is connected to the Q output of the D Flip-flop 32. The value of the Q output of the D Flip-flop 32 directs an upward or downward counting direction of the up/down counter 48. The input to the D Flip-flop 32 is connected to the output of the comparator circuit 20.

The power-on-reset circuit 28 is also coupled to the S input of an S/R latch 30. The Q output of the S/R latch 30 is connected to a fast/slow frequency selector 44. The output of the fast/slow frequency selector 44 is then connected to input of the up/down counter 48 through an inverter 46. The output of the fast/slow frequency selector 44 is also coupled to the CLK input of the D flip-flop 32 and to the control logic circuit 26. The power-on-reset circuit 28 sets the S/R latch 30 at the initialization of the liquid level gauge interface system. When the S/R latch 30 is set, it will enable a selection of a fast frequency clock signal by the fast/slow frequency selector 44 thereby causing the up/down counter 48 to reach a liquid level indication quickly. The S/R latch 30 is then reset once the actual liquid level indication begins. This is achieved by connecting the Q output of the D flip-flop 32 to the R input of the S/R latch 30. The reset of the S/R latch 30 will initiate a selection of a slow frequency clock signal to the fast/slow frequency selector 44. By selecting a relatively slow frequency clock signal for the up/down counter 48, the liquid level gauge interface system can accomplish the anti-slosh effect because a longer time span of measuring the new liquid level will average out the inevitable transient effects on liquid level during motor vehicle operation.

The input of the control logic circuit 26 is connected to the output of an oscillator 38 which provides the system clock signal with a predetermined clock frequency Fsys. The output of the oscillator 38 is also connected to the input of a divide-by-n circuit 40. In this figure n is 2, but it could be any value. The oscillator 38 is a ⅓–⅔ relaxation oscillator that is currently in production on various commercially available accurate timing function elements. The oscillator 38 can be externally connected to a capacitor Cosc 34 and an optional resistor Rosc 36. Cosc 34 and optional Rosc 36 are in parallel connection with one terminal grounded and the other terminal connected to the oscillator 38. By connecting Cosc 34 and optional Rosc 36, persons skilled in the art can externally control the frequency of the oscillator 38. The divide-by-two circuit 40 receives the system clock signal generated by the oscillator 38 and outputs a clock signal with one-half frequency (½ Fsys) as compared to the system clock signal. The output of the divide-by-two circuit 40 is coupled to an input of the fast/slow frequency selector 44. The one-half system frequency (½ Fsys) generated by the divide-by-two circuit 40 constitutes the fast frequency to be selected by the fast/slow frequency selector 44. The output of the divide-by-two circuit 40 is also connected to the input of a frequency divider circuit 42. The frequency divider circuit 42 divides the ½ Fsys frequency further by 1024 or some other large value. The output of the frequency divider circuit 42 is then coupled to the fast/slow frequency selector 44. The output of frequency selector 44 is one of the two frequencies provided as inputs, depending on the state of signal F/S as described. Thus either the fast frequency from divide-by-two circuit 40 or the slow frequency from frequency divider circuit 42 can be provided as the input to up/down counter 48.

The output of the up/down counter 48 is connected to a D/A converter 50. The D/A converter 50 can be an analog multiplexer with an output voltage corresponding to the digital value of the up/down counter 48. The output of the D/A converter 50 is connected to the inverting input of the comparator 20 where it is compared with the voltage measured by the liquid level sensor unit 12. If the output voltage value of the D/A converter 50 is less than the measured voltage value then the value of the up/down counter 48 is incremented by one. Conversely, if the output voltage value of the D/A converter 50 is more than the measured voltage value then the value of the up/down counter 48 is decreased by one. The D/A converter 50 is a 6-bit Digital-to-Analog converter such that only the six most significant bits of the up/down counter 48 are used for inputs of the D/A converter 50. This is intended to provide a very slow fuel gauge response without running into harmonic problem with standing waves in the fuel tank. The choice of a 6-bit D/A converter is a preferred embodiment of the present invention, it is, however, evident to persons skilled in the art to choose a similar type of D/A converter to achieve the aforementioned object.

The present invention has a current reference circuit 52 where the reference current Iref is set by a reference voltage, Vref, across two resistors RS1 62 and RS2 63 connected in series. The current reference circuit 52 mirrors the reference current Iref to the current switch 14 for exact measurements of the liquid level sensor unit 12 resistance, and thus corresponding voltage of a liquid level. The current reference 52 is also connected to a gauge driver 54. The gauge driver 54 mirrors and amplifies the reference current Iref by some factor of the supply voltage in order to drive a liquid level gauge 66. The output of the gauge driver 54 is fully protected from all specified transients and requires no external protection. The gauge driver 54 is also connected to the output of the D/A converter 50 to receive a corresponding voltage value of the liquid level to be translated by the gauge driver 54 and eventually showed on the reading of the liquid level gauge 66.

The output of the D/A converter 50 is further connected to the inverting input of a low fuel level detect comparator 56. The non-inverting input of the low liquid fuel detect comparator 56 is connected to a set point voltage, Vset, which is determined by a voltage divider circuit 61, if desired by a customer of the chip 10. The voltage divider circuit 61 is composed of the resistor RS1 62 and the resistor RS2 63 where RS1 62 and RS2 63 are connected in series from Vref to the ground. Vset is measured at a node 21 located between resistors RS1 62 and RS2 63. As a result, the value of the Vset will be Vref·RS2/(RS1+RS2). Resistors RS1 62 and RS2 63 may be externally connected, i.e., not included in the liquid level gauge interface system IC chip. By providing user-defined resistors RS1 62 and RS2 63, motor vehicle manufacturers can custom define a desirable Vset value. The output of the low liquid detect comparator 56 is connected to a lamp driver 58 which is capable of driving a GE194, or similar, lamp. The lamp driver 58 is fully protected such that the operation of the liquid level gauge 66 will not be affected if the lamp is faulted in any way. The output of the lamp driver 58 is connected to a low liquid warning lamp 68 via node 23 to provide a warning signal of low liquid level. The voltage Vset is also fed into the non-inverting input of a HI/LO toggle 60. The inverting input of the HI/LO toggle is connected to another voltage divider (not shown) to received a voltage value of one-half (½) Vref. The output of the HI/LO toggle is connected to the lamp driver 58 to enable or disable the lamp driver 58. For a set point voltage Vset below ½ Vref the low fuel warning lamp 68 will be illuminated when the corresponding voltage of a liquid level measured by the liquid level sensor unit 12 drops below the set point voltage Vset. If, alternatively, the set point voltage Vset is set above ½Vref then the low liquid warning lamp 68 will be illuminated when the corresponding voltage of a liquid level measured by the liquid level sensor unit 12 is above the set point voltage Vset.

Figure 3:
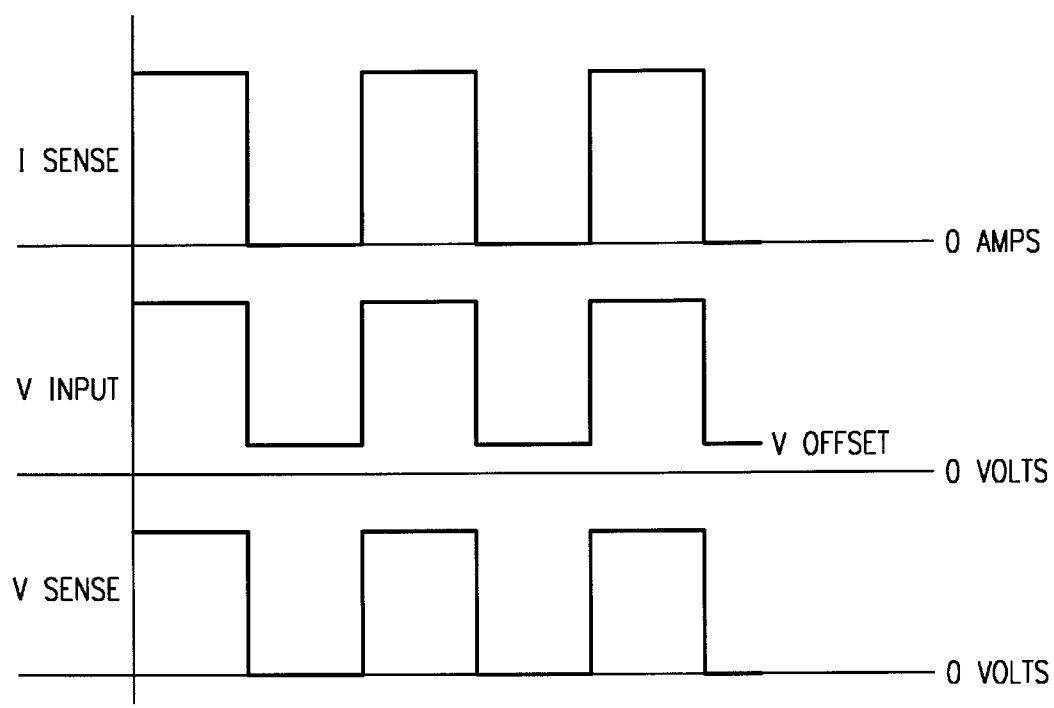
FIG. 3 is an electrical timing diagram of various signals in the circuit.

FIG. 3 shows three sense cycles. As can be seen by viewing V offset, the value of V offset may vary from one measurement to the next; however, the sense voltage will be automatically compensated to ensure proper measurement of the fuel level.

Although the liquid level gauge interface system have been described and shown in detail, it is intended to be a preferred embodiment of the present invention and is provided by way of example only. It will be apparent to persons skilled in the art that modifications or variations can be made without departing from the scope of the invention. Accordingly, the appended claims cover all such modifications or variations as falling within the spirit and scope of the present invention.

What is claimed is:

1. An integrated circuit embodied in a single semiconductor chip for providing a liquid level gauge display driving signal to a liquid level gauge, the integrated circuit receiving a liquid level signal from a liquid level sensor unit, the integrated circuit comprising:

a clock signal circuit for providing a clock signal at a clock frequency;

a digital logic circuit coupled to the clock signal circuit for converting the clock signal into a plurality of internal clock signals having different frequencies;

a comparing circuit coupled to said digital logic circuit for generating the liquid level gauge display driving signal and for comparing the liquid level signal with the liquid level gauge display driving signal;

a current switch circuit coupled to the comparing circuit for driving a reference current into the liquid level sensor unit, the reference current being converted into the liquid level signal having a voltage value proportional to a liquid level measured by the liquid level sensor unit, the voltage value of the liquid level signal then being fed into the comparing circuit; and a gauge driver circuit coupled to said comparing circuit for driving the liquid level gauge.

2. The integrated circuit in claim 1 wherein the comparing circuit includes:

a voltage comparator coupled to the liquid level sensor unit for comparing the liquid level signal with the liquid level gauge display driving signal, the voltage comparator having a plurality of inputs and an output wherein a first input receives a voltage value from the liquid level signal and a second input receives a voltage value from the liquid level gauge display driving signal;

a D flip-flop coupled to the output of the voltage comparator for receiving a comparing result;

an up/down counter coupled to the digital logic circuit for providing a count, the up/down counter receiving information from an output of the D flip-flop to determine an upward or a downward counting direction;

a power-on-reset circuit coupled to the D flip-flop for resetting the count stored in the up/down counter; and a digital-to-analog converter coupled to the up/down counter for converting the count to the liquid level gauge display driving signal.

3. The integrated circuit in claim 1 wherein the digital logic circuit includes:

a divide-by-n circuit connected to the clock signal circuit for providing a first frequency clock signal;

a frequency divider circuit connected to the divide-by-n circuit for generating a second frequency clock signal;

a frequency selector circuit connected to the divide-by-n circuit and the frequency divider circuit for selecting the first frequency clock signal or the second frequency clock signal;

an inverter connected to an output of the frequency selector circuit for outputting a frequency; and a set/reset latch coupled to the frequency selector circuit for enabling a selection of the first frequency clock signal during a first time interval and a selection of the second frequency clock signal during a second time interval.

4. The integrated circuit in claim 1, further comprising a low liquid level detection circuit.

5. The integrated circuit in claim 4 wherein the low liquid level detection circuit further includes an adjustable warning level circuit.

6. The integrated circuit in claim 5 wherein the adjustable warning level circuit includes a voltage divider circuit for providing a pre-selected reference voltage for the low liquid level detection circuit.

7. The integrated circuit in claim 3 where n is 2.

8. The integrated circuit of claim 1 wherein the clock signal circuit includes an oscillator.

9. The integrated circuit of claim 1 wherein the comparing circuit has a dynamic offset unit providing a ground offset value associated with the liquid level sensor unit.

10. An integrated circuit embodied in a single semiconductor chip for providing a liquid level gauge display driving signal to a liquid level gauge, the integrated receiving a liquid level signal from a liquid level sensor unit, the integrated circuit comprising:

a clock signal circuit for providing a clock signal at a clock frequency;

a digital logic circuit coupled to the clock signal circuit for converting the clock signal into a plurality of internal clock signals having different frequencies;

a comparing circuit coupled to said digital logic circuit for generating the liquid level gauge display driving signal and for comparing the liquid level signal with the liquid level gauge display driving signal;

a current reference circuit connected to a power supply wherein the current reference circuit provides a reference current to the liquid level sensor unit for measuring a liquid level having a corresponding voltage value from the liquid level sensor unit;

a current multiplying circuit wherein the current multiplying circuit offsets the reference current by a factor of the power supply's voltage value such that a mere fluctuation of the power supply's voltage value would not shift position, or change value, of an indicator of the liquid level gauge; and a gauge driver circuit coupled to said comparing circuit for driving the liquid level gauge.

* * * * *